United States Patent

[11] 3,530,912

| [72] | Inventor | Percy F. Freeman<br>4061 S. W. Greenleaf Drive, Portland,<br>Oregon 97221 |
|---|---|---|
| [21] | Appl. No. | 756,890 |
| [22] | Filed | Sept. 3, 1968 |
| [45] | Patented | Sept. 29, 1970 |

[54] BALE SHREDDER AND DISCHARGER
3 Claims, 8 Drawing Figs.
[52] U.S. Cl. ......................................................... 146/70.1
[51] Int. Cl. ....................................................... A01f 29/00,
A01f 31/00
[50] Field of Search .......................................... 146/70.1;
241/101.5

[56] References Cited
UNITED STATES PATENTS
| 2,989,252 | 6/1961 | Babb | 146/70.1UX |
|---|---|---|---|
| 3,208,491 | 9/1965 | Bliss | 146/70.1 |

*Primary Examiner*—Willie G. Abercrombie
*Attorney*—L. R. Geisler

ABSTRACT: A device mounted either on a separate trailer vehicle and adapted to be towed and operated by a tractor having a power take-off, or mounted on a truck and operated by the power take-off shaft from the truck transmission, the device comprising a large bin for receiving a supply of twine-tied bales, or wire-tied bales after the wires have been clipped, and equipped with means, driven from the power take-off, for shredding the bales and discharging the resulting material along the ground or otherwise as desired.

Patented Sept. 29, 1970
3,530,912
Sheet 1 of 3
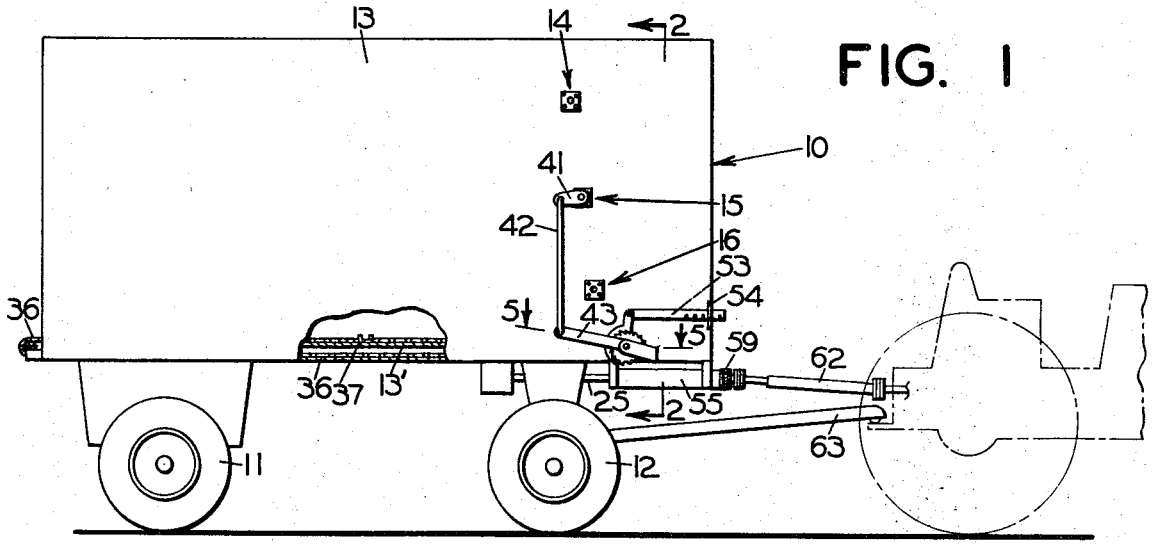
FIG. 1
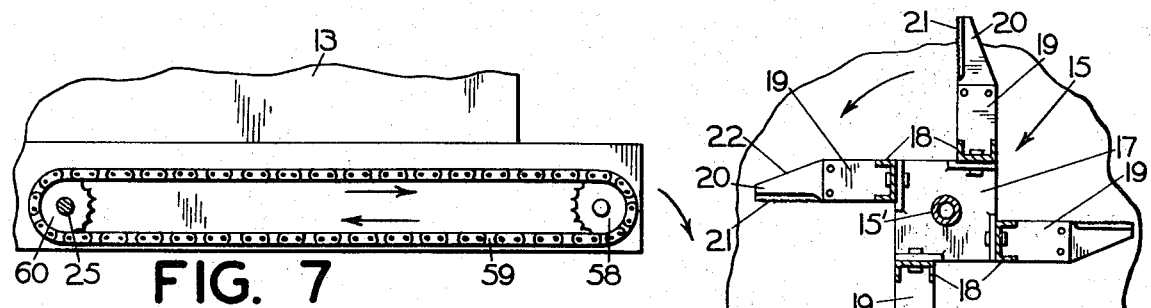
FIG. 7
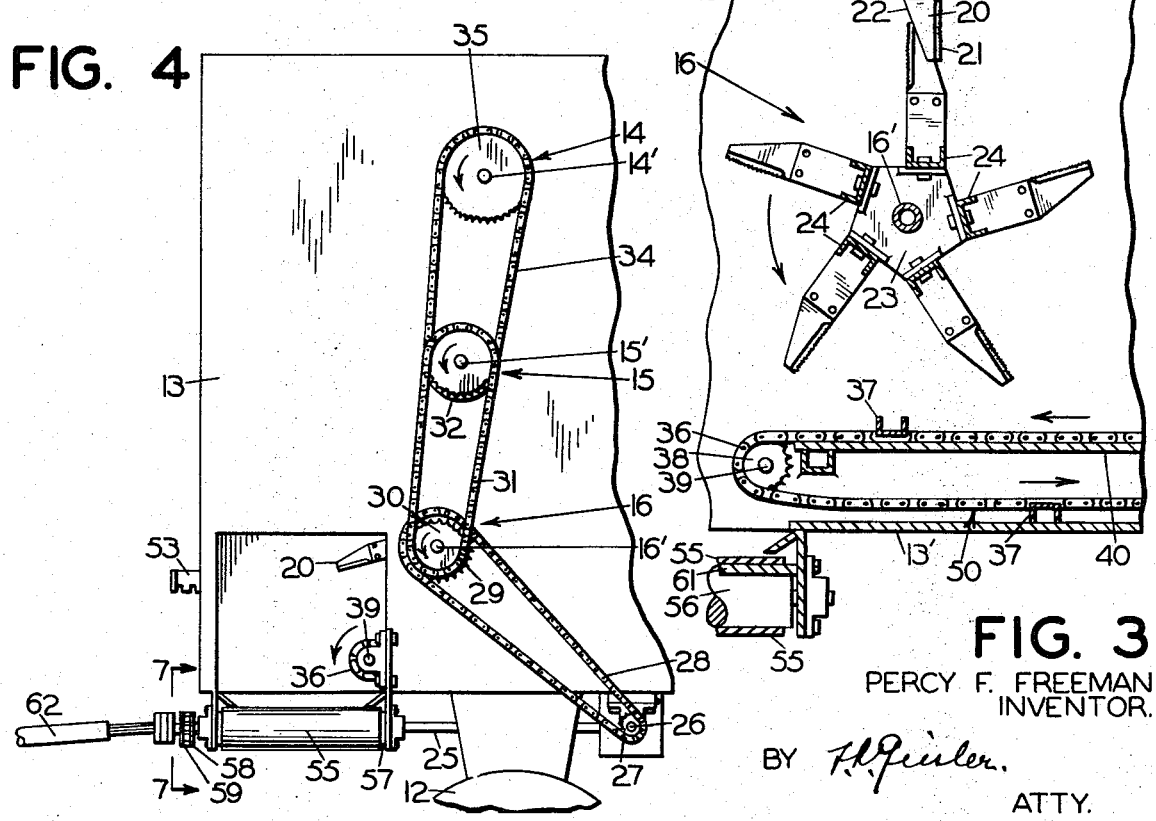
FIG. 4
FIG. 3
PERCY F. FREEMAN
INVENTOR.
BY *F. K. Geisler*
ATTY.

Patented Sept. 29, 1970

PERCY F. FREEMAN
INVENTOR.

BY *L. A. Geisler*
ATTY.

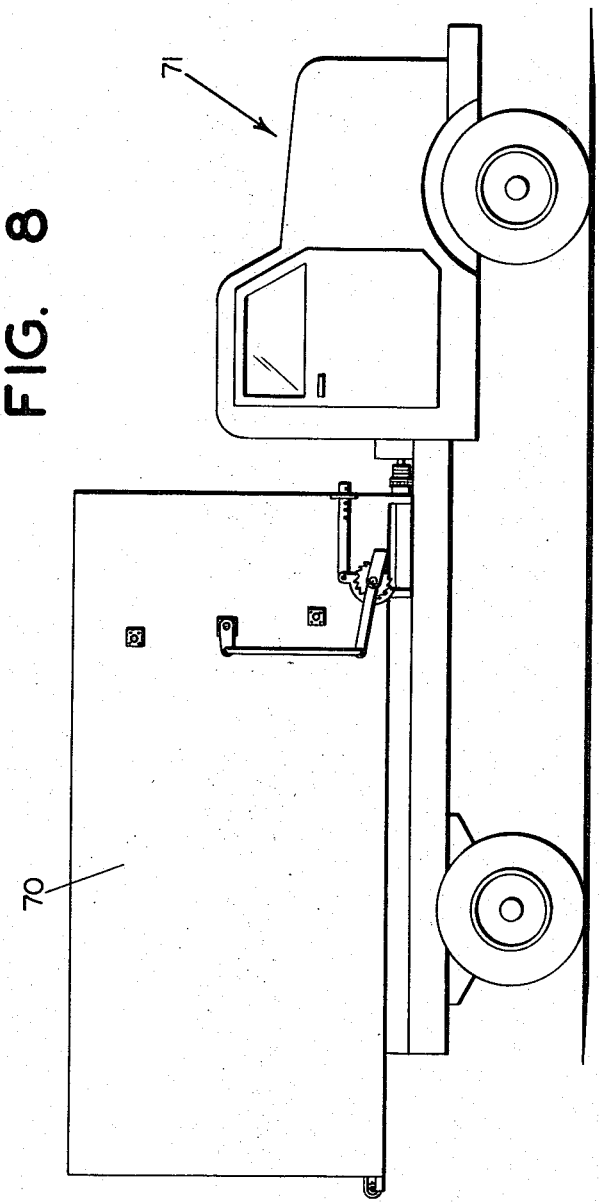

3,530,912

BALE SHREDDER AND DISCHARGER

BACKGROUND OF THE INVENTION

Trailer wagons of somewhat the same general type have been developed for receiving, conveying and distributing hay and other fodder loaded into the bin of the wagon in loose, bulk condition. The employment of such trailer wagons in general has taken place only at the location where the hay or other fodder is produced. However, many ranches and farms are now dependent largely upon outside sources for such material as hay, for example, needed for fodder, and, as is well known, hay is customarily baled for transportation and storage. Consequently where such baled material is being used, it is necessary to open up the bales and to loosen and shred the compressed material in order to bring it into suitable condition for consumption by livestock. Heretofore this breaking up of the bales and the loosening and shredding and spreading of the baled material has been done entirely manually at the expense of considerable labor. The object of the present invention is to eliminate most if not all of this labor.

OUTLINE OF THE INVENTION

To a considerable extent in the baling of hay and similar materials, the bales are tied by heavy twine instead of wire. Quantities of such bales can be dumped directly, by any suitable means, into the bin of the device of the present invention. In the event the bales are tied by wire instead of twine, the wire on each bale should be clipped first before the bale is dumped into the bin. However, clipping the wire on a bale, even though it is done manually, requires only a nominal amount of labor compared to the total amount of labor heretofore required in also loosening and shredding the baled material.

When the bales are dumped into the bin of the device, endless conveyors along the bin floor carry the bales forwardly and bring them into contact with rotating knife assemblies which chop up the bales and cause the loosened material from the broken or chopped bales to be shredded. The shredded material passes from the knife assemblies and is deposited on an endless transversely-moving conveyor belt which carries the material out of the device and off to one side for discharge. The discharged material can then be deposited on the ground, if desired, when the device is being moved over the ground, or with the device stationary, may be disharged into low bins, feed bunks, or into any other desired receptacles.

BRIEF DESCRIPTION OF THE DRAWINGS

In the accompanying drawings:

FIG. 1 is a side elevation showing the device mounted on a separate trailer vehicle or wagon, with a portion shown broken away for clarity, and showing the trailer wagon connected up to a towing tractor having a power take-off shaft, the rear portion of the tractor being indicated by broken lines;

FIG. 3 is a fragmentary sectional elevation on line 3–3 of FIG. 2 drawn to a slightly larger scale;

FIG. 4 is a fragmentary side elevation taken on line 4–4 of FIG. 2 drawn to a smaller scale;

FIG. 7 is a fragmentary sectional elevation on line 7–7 of FIG. 4 drawn to a slightly larger scale; and FIG. 8 is a side elevation illustrating the device as mounted on and constituting part of a truck instead of being mounted on a separate trailer vehicle.

The device will be described first as being mounted on a separate trailer vehicle or wagon and towed by a tractor. In FIG. 1 the trailer vehicle or wagon is indicated in general by the reference 10, having a suitable chassis frame supported on the usual pair of rear wheels 11 and forward steering wheels 12. The body of the trailer wagon is taken up entirely by the large rectangular bin 13, capable of holding a considerable number of bales. The bales are dumped into the rear half of the open bin by any suitable means. If the bales have been tied by the customary twine no prior treatment of the bales is required. However, if the bales have been tied by wire, the wire on each bale should be clipped first before the bale is dumped into the bin.

Figure 2:
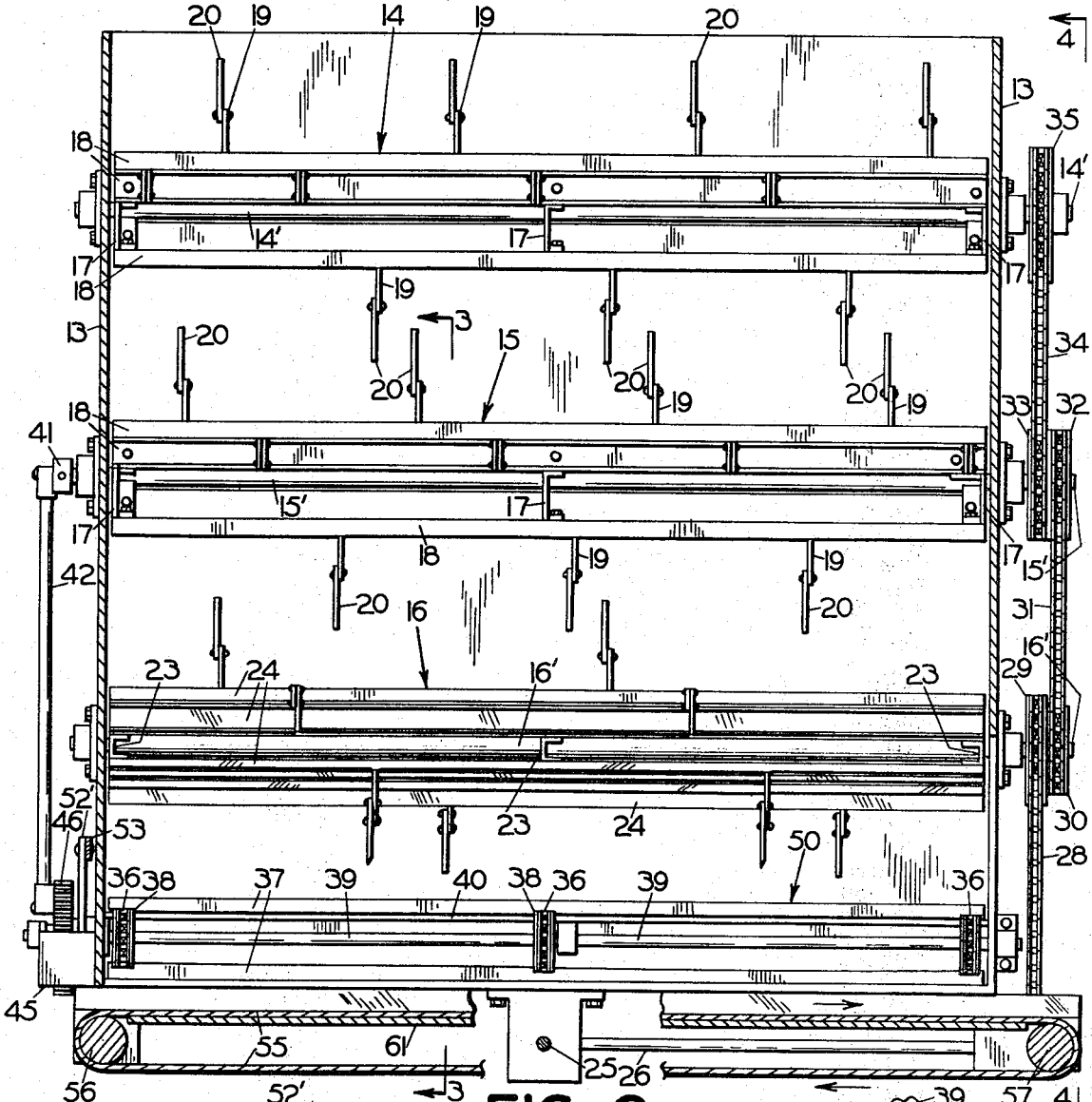
FIG. 2 is a sectional elevation taken on line 2–2 of FIG. 1 drawn to a much larger scale.

A plurality of horizontal, transversely mounted, rotating knife assemblies extend across the inside of the bin near the front of the bin, spaced one above the other. In the particular device illustrated, there are three such knife assemblies designated in general by the reference characters 14, 15, and 16, respectively. The relative positioning of these assemblies is indicated in FIG. 1. The knife assemblies themselves are shown clearly in FIG. 2 and the constructional details of two of these assemblies, namely the assemblies 15 and 16, are shown in FIG. 3. Each knife assembly consists of a main shaft (thus 14', 15' and 16' in the assemblies 14, 15 and 16, respectively, FIGS. 2 and 3), the end portions of which shafts are rotatably mounted in bearings supported in the two opposite side walls of the bin 13, respectively. The upper knife assemblies 14 and 15 are similar. In each of these assemblies square, vertical bracket plates 17 (FIG. 3) are secured near the ends of each of the main shaft and in the center portion of each main shaft. These bracket plates support four channel irons 18, arranged as shown in FIG. 3, which extend longitudinally the length of the knife assembly. These channel irons are secured to flanges on the bracket plates 17 by suitable bolts or screws. The knives are supported by the channel irons 18.

Each knife consists of a mounting bar 19, preferably welded to the supporting channel iron 18, and a knife blade 20 which is removably secured on the outer end of the mounting bar 19 by means of screws. Each knife blade, as shown in FIG. 3, has a forward beveled and serrated edge 21 in substantial alignment with the forward edge of the mounting bar 19 and perpendicular to the supporting channel iron. The rear edge of each knife blade preferably is forwardly inclined as shown at 22 in FIG. 3. The knives on each of the channel irons 18 are equally spaced but the knives on the different channel irons are staggered with respect to those on the other channel irons.

In the lower knife assembly 16 the bracket plates 23 (FIG. 3), instead of being square, are pentagonal and thus carry five longitudinally-extending channel irons 24 instead of four as in the case of assemblies 14 and 15. The knives mounted on the channel irons 24 in this lower knife assembly 16 are identical to those in the knife assemblies 14 and 15, and the knives on each channel iron 24 in knife assembly 16 are staggered with respect to those on the other channel irons in the same assembly.

From FIGS. 2 and 3 it will be noted that the knives of the adjacent assemblies cross the medial horizontal planes between the assemblies but do not pass in very close contact with each other as the knife assemblies rotate. Thus, the rotating knives, after breaking up the bales, perform mainly a shredding operation, the actual cutting of the material taking place for the most part only when the material offers resistance to shredding for one reason or another.

The knife assemblies 14, 15 and 16, as indicated in FIG. 4 and also indicated in part in FIG. 3, are all rotated in the same direction (thus counter-clockwise as viewed in figs. 4 and 3). The assemblies are driven by sprocket and chain connection from a bottom cross shaft 26 (FIG. 4), which is driven through suitable gearing from a centrally located and longitudinally-extending main shaft 25 which is connected with the power take-off shaft on the tractor. A sprocket 27 (FIG. 4), secured to the outer end of shaft 26, is connected by a sprocket chain 28 with a sprocket 29 secured on the end of the main shaft 16' of the lower knife assembly 16. A second sprocket 30 on the shaft 16' is connected by a sprocket chain 31 with a sprocket 32 on the end of the main shaft 15' of the next upper knife assembly 15. Similarly, a second sprocket 33 on the shaft 15'

(see also FIG. 2) is connected by a sprocket chain 34 with a sprocket 35 on the end of the shaft 14' of the upper knife assembly 14. These sprockets and sprocket chains are all located on the outside of a side wall of the bin 13 as apparent from FIGS. 2 and 4.

From FIG. 4 (and also from FIG. 2) it will be noted that the driving sprockets connected with the knife assemblies 14, 15 and 16 are so arranged and of such diameters that, preferably but not necessarily, the rotational speed of the knife assembly 15 is less than that of the lower knife assembly 16 and similarly the top knife assembly 14 is rotated at a slower speed than the knife assembly 15. Also, as will be noted from FIGS. 1 and 2, the second knife assembly 15 is preferably, but not necessarily, positioned slightly rearwardly with respect to the lower knife assembly 16 and the upper knife assembly 14 is positioned slightly still further toward the rear. Finally, as previously mentioned, the lower knife assembly 16 preferably has five longitudinally-extending channel irons to which the knives are attached, while the other two knife assemblies have four such channel irons each. The reasons for this preferred comparative positioning and relative rotational speeds of the knife assemblies will be explained later.

An endless conveyor assembly 50 is mounted at the bottom of the bin 13 and operates to move the bales supported on the conveyor assembly, and consequently all the bales in the bin, forwardly to the knife assemblies. As illustrated, the conveyor assembly includes three identical endless sprocket chains 36 (FIGS. 2 and 3) connected at regular intervals by transverse channel bars 37. The conveyor chains 36 pass around drive sprockets 38 at the forward end of their course, which drive sprockets are secured on a transversely-extending shaft 39 supported in journals mounted on the opposite side walls of the bin 13 (FIG. 2). The conveyor chains 36 pass around idler sprockets (not shown) at the rear of their course located at the rear of the bottom of the bin 13. The upper course of the conveyor assembly moves along a supporting platform 40 spaced a slight distance above the bottom 13' of the bin (shown best in FIG. 3), and which in effect constitutes an inner floor of the bin up to the front termination of the endless conveyor beneath the bottom rotating knife assembly. The conveyor assembly 50 is driven at adjustable speed with respect to the rotating knife assemblies through means which will now be briefly described.

Figure 6:
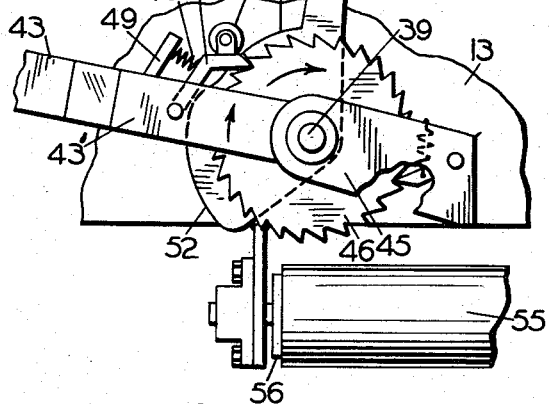
FIG. 6 is a fragmentary side elevation taken on line 6–6 of FIG. 5.
Figure 5:
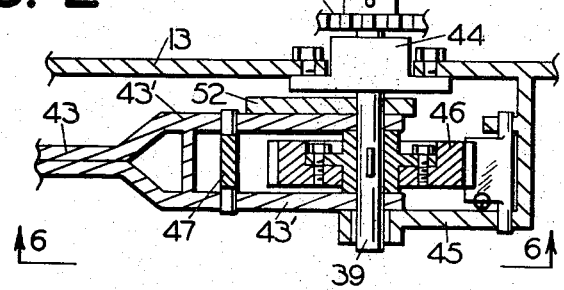
FIG. 5 is a fragmentary section on line 5–5 of FIG. 1, drawn to a larger scale.

A crank arm 41 (FIG. 1 and 2) is secured on the main shaft 15' for the knife assembly 15 on the end opposite that on which the sprockets 32 and 33 are secured and on the outside of the opposite bin wall. A rod 42 connects the crank arm 41 with the outer end of a compound forked lever arm 43, the inner forked ends 43' of which are rotatably supported on the end portion of the shaft 39 (FIGS. 2, 5 and 6). The outer end portion of the shaft 39 is rotatably supported in a journal 44 (FIG. 5) mounted in the wall of the bin 13, and in an outer mounting formed by a bracket 45 welded to the bin wall. A ratchet wheel 46 (FIGS. 5 and 6) is secured on a hub which is keyed on the shaft 39 and is positioned between the forks 43' of the compound forked lever arm 43.

A pawl 47 (FIG. 6), carried on a pivot shaft supported in the forks 43', is so arranged as to engage teeth on the ratchet wheel 46. The pawl 47 is spring-pressed by a coil spring 48 supported on a lug 49 mounted on the lever arm 43. The pawl 47 carries a cam roller 51 which rides on the cam periphery of a disc 52, which disc is also rotatably mounted on the shaft 39 (FIG. 5). The cam disc 52 has an arm 52' (FIG. 6) to which an adjusting bar 53 (see also FIG. 1) is connected. The adjusting bar 53 is slidably mounted in a bracket 54 on the side of the bin. The bottom edge of the free end of this bar 53 is provided with a series of notches so arranged as to engage the bottom of the bracket and thereby hold the adjusting bar 53, and therewith the cam disc 52, in desired position. The cam disc 53, through the intermediary of the cam roller 51 controlling the pawl 47 determines the number of ratchet teeth which the pawl will engage with each upward movement of the lever arm 43, and consequently determines the speed of rotation of the ratchet wheel 46, and therewith of the shaft 39 and conveyor assembly 50 with each rotation of the shaft 15' of the knife assembly 15.

At the front portion of the bin 13 the bottom 13' is discontinued beyond the lower knife assembly 16 and at the front termination of the conveyor assembly 50 (FIG. 3). Below this open bottom area a cross conveyor is positioned consisting of an endless belt 55 passing around end rollers 56 and 57 (FIG. 2) supported in suitable bearings mounted below the bottom of the bin at the opposite sides respectively. A sprocket 58 (FIGS. 4 and 7) is secured to the shaft on which the end roller 57 is secured, and an endless sprocket chain 59 (FIG. 7) connects the sprocket 58 with a sprocket 60 secured on the central main drive shaft 25 which is connected with the power take-off shaft from the tractor. The upper course of the cross conveyor 55 slides along a support platform 61 (FIG. 2) which is mounted beneath the bin in any suitable manner (not shown). The shredded material delivered onto the cross conveyor belt 55 is thereby discharged from the side of the wagon 10 at the front. A supplemental chute or supplemental spreader of familiar type (not shown) may be mounted below the discharging end of the cross conveyor if desired.

Thus the rotating knife assemblies 16, 15, and 14, the conveyor assembly 50 by which the bales in the bin are moved into contact with the knife assemblies, and the cross conveyor belt 55, which receives the material discharged from the knife assemblies and from the conveyor assembly 50, are all driven through the intermediary of various means connected with the central main drive shaft 25 as herein described. The drive shaft 25 is connected with the power take-off shaft of the tractor through the medium of a connecting assembly 62 (FIG. 1) comprising splined telescoping elements and universal joint connections which are well known in the art and which need not be described since they do not constitute part of the present invention. The trailer wagon 10 will, of course, be connected to the tractor by the customary tongue, as indicated in FIG. 1.

In the operation of the device the bales which are dumped into the bin are moved forwardly at a predetermined desired rate of speed until they encounter a rotating knife assembly. Assuming that the device is operating at substantially full capacity, with three layers of bales moving into engagement with the knife assemblies, the top layer of bales will first contact the knives in the upper rotating knife assembly 14. The action of these knives in breaking up the bales will result in some of the loosened and shredded material being thrown upwardly and forwardly causing it to drop down and fall on the front cross conveyor 55. However, some of the material from these upper bales, requiring further loosening and shredding, will drop down on and become mixed in with the bales in the next layer as these latter encounter the knives in the next lower knife assembly 15. The knives in the knife assembly 15 act similarly on the bales in the second layer and also on the remainder of the material dropped from the top layer, the knives in the second knife assembly 15 moving at increased speed and causing an increased amount of loosened and shredded material to be thrown forwardly and dropped down onto the front cross conveyor belt 55. Similarly some of the material engaged by the second knife assembly 15 will drop down for further engagement by the lowest knife assembly 16.

As will be apparent, with the device operating at substantially full capacity, the knife assemblies from the top down each have increased amounts of material to handle, and the amount of material handled by the bottom knife assembly 16 is considerably more than in the case of either of the other knife assemblies. Consequently, it has been found desirable not only to have the knife assemblies from the top down rotating at relatively greater speeds, but also to have the bottom knife assembly 16 composed of more rows (thus five) of knives.

Further, it has been found preferable to have the knife assemblies positioned in a slightly rearwardly sloping line (as shown in FIGS. 1 and 4) instead of having them vertically aligned, since this arrangement results in more of the baled material which does not receive sufficient shredding from an upper knife assembly dropping down to a lower knife assembly for further shredding treatment, instead of possibly forming a temporary congestion at the knife assembly first encountered.

It is possible that the combined knife assemblies will not be able to take care of the shredding of the bales as rapidly as the bales are being fed to the knives. In such event, an increasing accumulation of material at the lower knife assembly 16 will immediately be apparent. This can be remedied by reducing the speed of travel of the conveyor 50 with respect to the rotational speeds of the knife assemblies, and this speed adjustment is easily carried out in the manner and by the means previously described.

The function of the rotating knife assemblies is to break up the bales and to cause material therefrom to become loosened and shredded. Actual chopping or cutting up of the baled material into very short lengths, particularly in the case of hay, for example, is not desirable when producing fodder for livestock. Of course, some cutting of the long strands or stalks of the hay will be a necessary part of the shredding, and the front edges of the knife blades will be able to perform whatever cutting is necessary while the serrations in these edges will primarily exert a pulling and shredding action rather than a cutting action.

Referring now to the modification shown in FIG. 8, the bin 70 is shown as mounted on and constituting a part of the truck which is indicated as a whole by the reference 71. The bin 70 is similar to the bin 13 of FIG. 1 and is equipped with the same rotating knife assemblies, arranged, positioned and operated in the same manner as previously described. The bin 70 also has the same conveyor means moving forwardly along the bottom of the bin, for moving the bales in the bin up to the knife assemblies, as previously described for bin 13 of FIG. 1, and the same means for adjusting the speed of the conveyor means with respect to the rotation of the knife assemblies. Finally the bin 70 is provided with a cross conveyor belt in the lower front portion beyond the rotating knife assemblies identical to the endless cross conveyor belt 55 of the bin 13 as previously described. All the mechanism of the bin assembly in this modification of the device is driven from a main drive shaft (not shown) corresponding to the main drive shaft 25 previously described, which main drive shaft in this case is driven by the power take-off from the transmission in the truck 71. In all other respects the bin assembly of the device as illustrated in FIG. 1 is the same as that of the bin assembly previously described with reference to the preceding figures.

I claim:

1. A device for shredding baled material comprising a bin into which the bales are dumped for shredding, supporting vehicle means for said bin, a plurality of rotating knife assemblies in the forward portion of said bin positioned at different distances above the bottom of said bin, each knife assembly comprising a horizontal main shaft having its end portions journaled in the side walls of said bin respectively, a plurality of bracket plates secured on said main shaft, horizontal bars secured on the edges of said bracket plates, and a plurality of knives on each of said horizontal bars, each knife confined entirely to a single, vertical plane, the knives in each assembly mounted in staggered arrangement with respect to each other and with respect to the knives in an adjacent assembly, the vertical spacing between said knife assemblies being such that the knives in adjacent assemblies will intersect the horizontal plane located midway between the adjacent assemblies, the arrangement of the knives in said assemblies also being such that the lateral spacing between the knives which pass each other will be sufficient to prevent any scissors action, motor driven means having a power take-off shaft, means operated from said power take-off shaft for rotating said knife assemblies, a conveyor moving forwardly along the bottom of said bin for moving the bales in the bin up to said knife assemblies, means connected with said knife assembly rotating means for operating said conveyor, speed adjusting means in said conveyor operating means for adjusting the speed of said conveyor with respect to the rotation of said knife assemblies, and a cross conveyor belt at the bottom of the forward end of said bin beyond said first mentioned conveyor and beyond said bottom knife assembly for conveying the material discharged from said knife assemblies out from the side of the forward end of said bin, said cross conveyor belt being driven by said means operated from said take-off power shaft.

2. The combination set forth in claim 1 with said knife assemblies from the top down located progressively at slightly greater distances from the rear of said bin and with said means for operating said knife assemblies so arranged that said assemblies are rotated at different speeds which increase progressively downwardly and with the number of knife-carrying horizontal bars being greater in the bottom knife assembly than in the other knife assemblies.

3. The combination set forth in claim 2 with each knife consisting of a stem and a blade removably secured on the stem, each knife blade having a straight beveled and serrated forward edge and a rear edge inclined towards the outer end of said forward edge.